United States Patent
Perks et al.

(10) Patent No.: US 10,157,415 B2
(45) Date of Patent: Dec. 18, 2018

(54) SYSTEM, METHOD, AND MEDIUM FOR GENERATING A MAP OF A GEOGRAPHIC REGION BASED ON CLIENT LOCATION DATA

(71) Applicant: Microsoft Technology Licensing, LLC, Redmond, WA (US)

(72) Inventors: Barbara Leigh Perks, Mercer Island, WA (US); Anastasia Paushkina, Redmond, WA (US); Nektarios Ioannides, Bellevue, WA (US); Lawrence Lam, Bellevue, WA (US); Sonam Saxena, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 364 days.

(21) Appl. No.: 14/857,460

(22) Filed: Sep. 17, 2015

(65) Prior Publication Data

US 2016/0104232 A1 Apr. 14, 2016

Related U.S. Application Data

(63) Continuation of application No. 12/945,910, filed on Nov. 15, 2010, now Pat. No. 9,141,987.

(51) Int. Cl.
*G06Q 30/00* (2012.01)
*G06Q 30/06* (2012.01)
(Continued)

(52) U.S. Cl.
CPC ....... *G06Q 30/0639* (2013.01); *G01C 21/005* (2013.01); *G06F 17/30241* (2013.01);
(Continued)

(58) Field of Classification Search
CPC .......... G06Q 30/06; G06Q 30/0601–30/0643; G06Q 30/08
See application file for complete search history.

(56) References Cited

U.S. PATENT DOCUMENTS

| | | | |
|---|---|---|---|
| 6,533,173 B2 | 3/2003 | Benyak | |
| 7,386,477 B2 | 6/2008 | Fano | |

(Continued)

FOREIGN PATENT DOCUMENTS

| | | | |
|---|---|---|---|
| KR | 1020090106148 A | 10/2009 | |
| TW | 201015475 A | 4/2010 | |

OTHER PUBLICATIONS

Reisinger, Don, "Online Tools for Price-Conscious Shoppers", Retrieved at <<http://news.cnet.com/8301-17939_109-10240949-2. html>>, May 14, 2009, pp. 1-4.

(Continued)

*Primary Examiner* — William J Allen
(74) *Attorney, Agent, or Firm* — Medley, Behrens & Lewis, LLC

(57) ABSTRACT

Described herein are technologies pertaining to presenting a map to a user that comprises graphical icons that are representative of retail stores. The user has provided a shopping list, wherein the shopping list includes a plurality of products that are desirably purchased by the user. Inventories of retail stores in a geographic region of interest to the user are searched, and a map is generated that includes graphical icons representative of the retail stores, data that indicates that product(s) in the shopping list are available at the retail stores, and price data that indicates prices of product(s) in the shopping list at the respective retail stores.

20 Claims, 9 Drawing Sheets

(51) Int. Cl.
  *G06F 17/30* (2006.01)
  *G01C 21/00* (2006.01)
(52) U.S. Cl.
  CPC ..... *G06Q 30/0625* (2013.01); *G06Q 30/0631* (2013.01); *G06Q 30/0641* (2013.01)

(56) References Cited

U.S. PATENT DOCUMENTS

| | | | |
|---|---|---|---|
| 7,464,050 | B1 | 12/2008 | Deaton et al. |
| 7,756,757 | B1 | 7/2010 | Oakes, III |
| 7,945,484 | B1 | 5/2011 | Tam et al. |
| 8,065,353 | B2 | 11/2011 | Eckhoff-Hornback et al. |
| 9,141,987 | B2 * | 9/2015 | Perks ................. G06Q 30/0631 |
| 2002/0069115 | A1 | 6/2002 | Fitzpatrick |
| 2002/0174021 | A1 | 11/2002 | Chu et al. |
| 2005/0097005 | A1 | 5/2005 | Fargo |
| 2005/0160014 | A1 | 7/2005 | Moss et al. |
| 2007/0118430 | A1 | 5/2007 | Wiseman et al. |
| 2007/0150369 | A1 | 6/2007 | Zivin |
| 2008/0021950 | A1 | 1/2008 | Schirmacher et al. |
| 2008/0140649 | A1 | 6/2008 | Williams |
| 2009/0012865 | A1 | 1/2009 | Celik |
| 2009/0063261 | A1 | 3/2009 | Scribner et al. |
| 2010/0030624 | A1 | 2/2010 | Vanska et al. |
| 2010/0082447 | A1 | 4/2010 | Lin et al. |
| 2010/0088148 | A1 | 4/2010 | Presswala et al. |
| 2010/0191582 | A1 | 7/2010 | Dicker et al. |
| 2011/0213661 | A1 * | 9/2011 | Milana ................... G06Q 30/02 705/14.52 |

OTHER PUBLICATIONS

"Office Action and Search Report Issued in Chinese Patent Application No. 201110360982.1", dated Dec. 24, 2013, 10 Pages.
"Office Action Issued in Chinese Patent Application No. 201110360982.1", dated Aug. 28, 2014, 10 Pages.
"Response to Second Office Action", Filed Nov. 18, 2014 with the State Intellectual Property Department of the People's Republic of China, pp. 1-10.
"Third Office Action for Chinese Patent Application No. 201110360982.1", dated Mar. 26, 2015, 9 Pages.
"Response to the Office Action for Chinese Patent Application No. 201110360982.1", Filed Date: Jun. 8, 2015, 11 pages.
"Non-Final Office Action for U.S. Appl. No. 12/945,910", dated Sep. 16, 2013, 18 pages.
"Response to the Non-Final Office Action for U.S. Appl. No. 12/945,910", Filed Date: Mar. 17, 2014, 18 pages.
"International Search Report for PCT Patent Application No. PCT/US2011/058833", dated Jun. 28, 2012, 9 pages.
"Final Office Action for U.S. Appl. No. 12/945,910", dated Apr. 3, 2014, 29 pages.
"Response to the Final Office Action for U.S. Appl. No. 12/945,910", Filed Date: Aug. 11, 2014, 13 pages.
"Advisory Action for U.S. Appl. No. 12/945,910", dated Aug. 19, 2014, 3 pages.
"Non-Final Office Action for U.S. Appl. No. 12/945,910", dated Oct. 28, 2014, 22 pages.
"Response to the Non-Final Office Action for U.S. Appl. No. 12/945,910", Filed Date: Apr. 6, 2015, 16 pages.
"Notice of Allowance and Fees Due for U.S. Appl. No. 12/945,910", dated May 19, 2015, 10 pages.
"Notice of Allowance Issued in Taiwan Patent Application No. 100137400", dated Dec. 23, 2015, 4 Pages.
"Office Action and Search Report Issued in Taiwan Application No. 100137400", dated Sep. 23, 2015, 14 Pages.
Newcomb, et al., "Mobile Computing in the Retail Arena", In Technical Report GIT-GVU-03-02, College of Computing/GVU Center, Georgia Institute of Technology, Jan. 2003, 12 Pages.
"Office Action Issued in Chinese Patent Application No. 201110360982.1", dated Sep. 25, 2015, 8 Pages.
"Office Action Issued in Chinese Patent Application No. 201110360982.1", dated Dec. 14, 2016, 19 Pages.

* cited by examiner

SYSTEM, METHOD, AND MEDIUM FOR GENERATING A MAP OF A GEOGRAPHIC REGION BASED ON CLIENT LOCATION DATA

RELATED APPLICATION

This application is a continuation of U.S. patent application Ser. No. 12/945,910, filed on Nov. 15, 2010, and entitled "SYSTEM, METHOD, AND MEDIUM FOR GENERATING A MAP OF A GEOGRAPHIC REGION BASED ON CLIENT LOCATION DATA", the entirety of which is incorporated herein by reference.

BACKGROUND

Many retail stores have websites corresponding thereto such that an individual wishing to shop at that retail store can direct an Internet browser toward the website of the retail store and search for products that the retail store sells online. For example, the individual may enter a keyword or phrase into a text entry field and the website could be configured with search functionality that searches for a product or products corresponding to the keyword or phrase. Products located through use of the search can be displayed to the user such that the individual can view pictures of the product at different angles and be provided with a price for the product at the retail store. The individual may then choose to purchase the product online by providing the website with account information (e.g., credit card or debit card account information). The purchased product is subsequently shipped to the individual such that the product arrives at a specified location a few days subsequent to the individual purchasing the product via the website.

Alternatively, if the individual wishes to view the product and obtain the product on the same day, the individual can travel to the retail store to purchase the product. Oftentimes, however, it is difficult to ascertain whether the product is in stock at the retail store. Thus, the individual can take the time to drive to the retail store only to find that the retail store does not have the product in stock or is priced at a price point that is above what the individual wishes to pay for the product.

SUMMARY

The following is a brief summary of subject matter that is described in greater detail herein. This summary is not intended to be limiting as to the scope of the claims.

Described herein are various technologies pertaining to recommending products to a user. With more specificity, described herein are various technologies pertaining to presenting recommended products to a user on a map such that the user can quickly ascertain which stores have a recommended product in stock and location of such stores. A graphical user interface can be provided that allows the user to identify a product or list of products that the user is interested in purchasing. This product or list of products can be generated in any suitable fashion including, but not limited to, the user providing text that identifies the product, the user selecting one or more hyperlinks to identify the product, through a bar code scan, through an image capture of the product, etc.

Given the product or list of products, a search can be conducted over inventories of a plurality of stores in a geographic area of interest to the user. The geographic area of interest to the user may be a geographic region that the user resides, a geographic region that is based upon a current geographic region of the user, a geographic region that corresponds to a future geographic region of the user, etc. The search for the product or list of products can be conducted over inventories of stores in the geographic region of interest. These inventories can be updated in real-time or near real time by the retail stores. For example, many retail stores currently tag products with radio frequency identifier (RFID) tags such that inventory of the stores can be updated almost immediately upon a product being purchased. This real-time inventory can be made available by the retail stores or mined from a website such that inventories corresponding to multiple retail stores can be searched over concurrently.

Subsequent to the search for the list of products being performed, a map can be generated that displays to the user graphical icons that are representative of different retail stores in a geographic area of interest to the user that have one or more of the products currently in stock, as well as price data corresponding to the one or more products in stock at the retail stores. Accordingly, by reviewing the map, the user can quickly ascertain which stores have a product of interest in stock, which stores are closest to the user and which stores have the cheapest prices for the products of interest. The map can include additional data that can aid the user in selecting products or performing a shopping trip. For instance, each store can be represented by a graphical icon on the map and a selectable hyperlink can be shown in conjunction with each graphical icon. If the user selects the hyperlink corresponding to a particular retail store, driving directions from a current location of the user to the retail store can be presented to the user. Furthermore, selectable hyperlinks that, when selected, cause particular types of optimizations to be performed can be displayed to the user. For instance, selection of a particular hyperlink can provide the user with a detailed shopping plan to obtain the product or list of products at the cheapest possible price. Furthermore driving directions can be provided to allow the user to obtain the list of products at the cheapest price in the shortest amount of time. Another optimization may be completing a shopping list in a shortest amount of time regardless of price. Other optimizations are also contemplated.

Additionally it is understood that each product has a plurality of parameters associated therewith. Exemplary parameters corresponding to a product include price, brand, model number, features, etc. These parameters may have one or more constraints corresponding thereto, such that a search for a product is constrained to a particular brand, a particular model number, a particular price, etc. When performing the search for products, one or more of these constraints can be relaxed such that the search can be expanded to locate similar/recommended products. For example, products can be recommended based upon the user shopping profile, previous user purchase patterns, purchase patterns of the general population, user recommendations, etc. Inventories of the plurality of stores in a geographic area of interest to the user can be searched for recommended products and the map can be generated to illustrate to the user locations of stores that have these recommended products and prices corresponding thereto. Therefore, the user can ascertain from viewing the map that, for example, purchasing the product on the list would require paying additional money and traveling a greater distance when compared to purchasing a recommended product, which may be priced lower and available at a retail store that is closer to the current location of the user.

Other aspects will be appreciated upon reading and understanding the attached figures and description.

DETAILED DESCRIPTION

Figure 1:
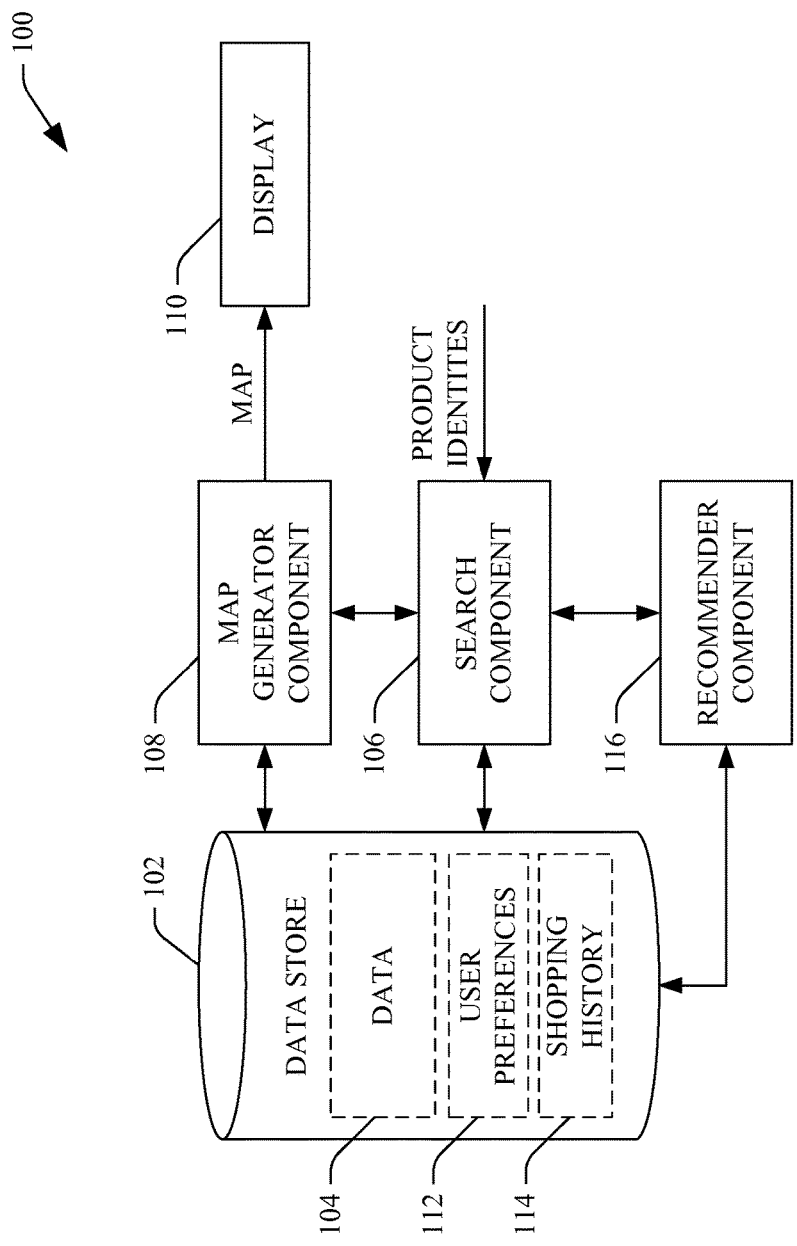
FIG. 1 is a functional block diagram of an exemplary system that facilitates generating a map that illustrates locations of retail stores that have one or more products of interest to the user in stock.

Various technologies pertaining to purchasing one or more products will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

With reference to FIG. 1, an exemplary system 100 that facilitates providing a user with a map that includes a representation of stores in a geographic area of interest and indications of certain products being in stock at such stores is illustrated. The system 100 includes a data store 102. For example, the data store 102 may be resident upon a server or accessible to a server. The data store 102 may be managed by a retail store or may comprise data that pertains to a retail store. The data store 102 can include data 104, which comprises product identities, price information pertaining to the products, locations of retail stores, and inventory data of the retail stores (which may be updated in real time or near real time). With more particularity, the data 104 can include inventory data with respect to one or more retail stores that are at particular geographic locations. Additionally, the data 104 can include price information pertaining to products in the inventory of the stores. Thus, in summary, the data 104 can include inventory data and pricing data for a plurality of different retail stores located at a plurality of different locations.

The system 100 further comprises a search component 106 that is configured to access the data store 102 and search over the data 104 responsive to receipt of an identification of a product or list of products from a user. The user can provide the product or list of products to the search component 106 in any suitable manner. In an example, a graphical user interface can be provided to the user in an Internet browser when the user directs the browser to a particular website, and wherein the graphical user interface includes a text entry field. The user can enter text into the text entry field that identifies or describes a particular product, and the search component 106 can search over the data 104 in the data store 102 based at least in part upon the textual description/identification. In another example, a graphical user interface can be provided to the user that facilitates an interactive determination of a product or products of interest to the user. For example, the user may indicate via the graphical user interface that they are interested in a particular type of product (e.g., electronics). Thereafter, a plurality of different types of electronics can be presented to the user and the user can narrow the search for a particular product that is of interest to the user. Through this approach, the user can identify a product or series of products that are of interest to the user.

In still yet another example, the user may be utilizing a mobile computing device such as a mobile telephone and be shopping at a particular retail store. The user may see a product that is of interest to the user and can capture an image of such product and transmit the image to the search component 106 (e.g., by way of an application installed on the mobile computing device). The search component 106 may be configured with image analysis functionality such that the product or type of product can be identified by the search component 106. Thereafter, the search component 106 can perform a search over the data 104 in the data store 102 based at least in part on this identification of the product. In another example, the user may be at a retail store and have access to a mobile computing device that is capable of capturing images of bar codes or performing scans of bar codes. The bar codes can identify certain products, and can be provided to the search component 106. In an exemplary embodiment, the bar codes can be analyzed by a software module that is configured to identify products based upon the bar codes, and product identities can be provided to the search component 106. Subsequently the search component 106 can perform a search over the data 104 in the data store 102 based upon the identities of the product(s) selected by the user.

In addition to receiving identity of a product or identities of products, the search component 106 can receive an indication of a geographic location of interest to the user. The geographic location of interest can be inferred based upon a determined current location of the user (e.g., through utilization of GPS, through analysis of an IP address, etc.) or based upon explicitly provided user preferences. In another example, the geographic area of interest to the user can be inferred based upon historical shopping patterns of the user.

Accordingly, the search component 106 can refine the search over the data 104 such that the search is performed over retail stores that are in the geographic area of interest to the user. The output of the search performed by the search component 106 can include identities of retail stores that have one or more products in the list of products provided by the user in stock, wherein such retail stores are in the geographic area of interest to the user. Furthermore, output of the search can include prices pertaining to the products at the retail stores that have the products in stock.

The system 100 further comprises a map generator component 108 that generates a map for display to a user on a display 110 of a computing device. The map generated by the map generator component 108 can include detailed street level data pertaining to the geographic area of interest to the user as well as graphical icons that are representative of retail stores that have one or more products in the list of products currently in stock. Accordingly, when viewing the map, the user can quickly ascertain which retail stores have in stock products of interest to the user and location of such retail stores with respect to the geographic area of interest to the user. The map generated by the map generator component 108 can further include price information with respect to products that are in stock at the retail stores represented on the map, such that the user can ascertain which stores have which products in stock and at what price(s). The map generator component 108 can further cause additional information corresponding to the retail stores in the geographic area of interest to be displayed on the map. This information can include information with respect to current sales at the retail stores, future sales that will occur at the retail stores, return policies of the retail stores, etc., thereby allowing the user to make an educated decision as to where they would like to purchase product on the shopping list and at what price.

Moreover, the map generator component 108 can provide selectable hyperlinks that correspond to the graphical icons that are representative of the retail stores on the map. Selection of the selectable hyperlinks can cause the map generator component to output driving directions to a particular retail store from the current location of the user or from a reference location provided by the user. Therefore, if the user determines that she wishes to travel to a particular retail store that is represented on the map generated by the map generator component 108, the user can select a selectable link corresponding to the retail store on the map which then causes the map generator component 108 to output driving directions to that retail store to the user for display on the display 110.

Still further, the map generator component 108 may be configured to cause selectable hyperlinks to be displayed on the map that, upon selection thereof, cause one or more optimizations to be performed with respect to a shopping trip of the user. For example, the user may wish to purchase each available item in the list of items provided to the search component 106 for a cheapest price. Obtaining each item at a cheapest price may require that the user travel to different retail stores at different locations. Upon selecting the selectable hyperlink, an optimization can be performed by the map generator component 108 that causes a detailed shopping itinerary to be presented to the user on the display 110, wherein the itinerary is expected to cause a user to purchase the products in the list of products received by the search component 106 at a cheapest price and in a least amount of time. This shopping itinerary may include directions such as "first travel to store A to purchase items X and Y, then travel to store B to purchase items Z and Q and then travel to store C to purchase items W and P."

Another exemplary optimization that can be performed is one that causes a user to purchase each item on the shopping list in a least amount of time, regardless of price. For instance, products in a list of products may be spread across multiple retail stores, such that the user is unable to purchase all of the at a single retail store. In such a case, the optimization can provide the user with directions that will cause the user to complete their shopping list in the least amount of time possible. In still yet another exemplary optimization, travel expense can be taken into consideration when generating a shopping itinerary, wherein such expense can be based upon current gas prices in the geographic area of interest to the user, cost of taxi fare in the geographic area of interest to the user, cost of public transit in the geographic area of interest to the user, etc. Furthermore, the optimizations can be undertaken with respect to various modes of transportation, including walking, biking, public transportation, type of vehicle utilized by the user, etc.

The map generator component 108 can generate driving directions, for example, based upon current or predicted traffic conditions along the routes to be traveled by the user. For instance, one or more sensors may be associated with vehicles traveling along roads near the retail stores. These can provide data that indicates the flow of traffic along certain roads and/or at particular intersections. In another example, historical traffic patterns can be utilized to predict traffic conditions when the user will be traveling to the retail stores depicted on the map generated by the map generator component 108. It is to be understood that any suitable mechanism for determining driving directions from the user to and between retail stores is contemplated and intended to fall under the scope of the hereto appended claims.

It has been mentioned above that the user can interactively add products to the list of products and the search component 106 can update the search based upon added products. An example of interactively adding products to the product list can include the map generator component 108 generating a map that illustrates retail stores, products, and pricing information thereon. The user may select a graphical icon pertaining to one particular retail store, which can cause a plurality of similar or recommended products to be presented to the user, wherein these similar or recommended products can be accessories, substitutes, etc. The user may select one of these similar/recommended products, which can update the shopping list. The search component 106 may then perform the search over the data 104 in the data store 102 to update locations and prices pertaining to all the products in the product list.

Furthermore, the map generator component 108 can be configured to contemplate different parameters associated with the retail stores such as certain discounts provided to users when they spend a particular amount of money, whether the user has a preferred shopping card with one or more of the retail stores that allow the user to obtain bonuses of some sort, etc. The map generator component 108 can generate the map such that the price information is indicative of the price without these bonuses and prices that are inclusive of bonuses, sales, etc. Therefore, the map generated by the map generator component 108 can illustrate to the user the total expected prices to be paid by the user for a product or list of products given the user's membership information, current coupons and discounts, etc.

In another exemplary embodiment, in many cases the user may not wish to travel to the stores and/or may wish to view prices for products provided by online retail stores. In addition to the data 104, the data store 102 may also comprise price data and inventory data for products that are offered by one or more online retail stores. This pricing information can be displayed in side panel by the map generator component 108. Accordingly, when the user proffers products to the search component 106, the resulting map generated by the map generator component 108 can include graphical icons that are representative of retail stores that have one or more of the products in inventory as well as a side panel that illustrates online stores that have one or more of the products in inventory and prices corresponding thereto. Additionally, the side panels can include information such as return policies of the online retail stores, shipping costs pertaining to certain products, etc. such that the user can balance time, price and value/budget considerations when purchasing one or more products from the list of products.

The data store 102 may further comprise user preferences 112, wherein these user preferences 112 can be inferred based upon historical shopping patterns of the user or explicitly provided by the user such as for instance, in the form of a profile. These user preferences 112 can indicate preferred brands of a user, whether the user is willing to consider other products that are outside of the same price range as provided products, amongst other preference data. The data store 102 can further comprise shopping history 114 of the user and/or other users that employ the system 100. The shopping history 114 can be mined to determine which products users buy in conjunction, which products are shopped for by users in conjunction, etc.

The system 100 further comprises a recommender component 116 that is in communication with the search component 106 and can output one or more recommended products to the user based at least in part upon the products in the shopping list, the user preferences 112, and/or the shopping history 114. With more specificity, each product in the product list may have at least one parameter corresponding thereto, wherein such parameter may be, for instance, price, brand, model number, a certain feature of the product, etc. At least one parameter of a product in the product list can have a constraint corresponding thereto. Continuing with the above example, the constraints can be a constraint on a brand of product, a constraint on the model number of the product, a constraint on price of the product, etc. The recommender component 116 can receive the list of products and can relax at least one constraint corresponding to at least one product. This constraint can be relaxed based upon the user preferences 112 and/or the shopping history 114 in the data store 102. For example, if the user has in the past been willing to consider a variety of different types of brands when purchasing electronics, then the recommender component 116 can relax a constraint on the brand of an electronic in the product list. The search component 106 may then search over the data 104 in the data store 102 to determine if any retail stores and/or online retailers have products corresponding to the relaxed constraint. If one or more products are found in the data 104 by the search component 106, the search component 106 can inform the map generator component 108 of the recommended product, one or more retail stores that have the recommended product in stock, and price of the recommended product to be shown in the map. Additionally, data indicative of the fact that the retail store has a recommended product can be displayed on the map together with pricing data corresponding to the product. Accordingly, when the user views the map on the display 110, the user can ascertain that a particular retail store has a recommended/substitute product, and the user can choose to further review these recommended products, for instance, by selecting a selectable hyperlink corresponding to the retail store where such recommended product is in stock.

As indicated above, the user preferences 112 in the data store 102 can be explicitly provided by the user in the form of a user shopping a profile. For instance, upon initial utilization of the system 100, the system 100 can be configured to output a graphical user interface that requests certain types of shopping information from the user. This information can include, for instance, preferred items that are shopped for by the user, whether the user is willing to relax a constraint pertaining to brands, products, price, shopping habits of the user, favorite retail stores of the user, etc. The recommender component 116 may then access this profile in connection with providing shopping recommendations to the user, and the map generator component 108 can generate the map such that information pertaining to recommended products is displayed thereon.

Some exemplary utilizations of the system 100 will now be provided for purposes of explanation. A user may be sitting at home and generating a shopping list on a personal computer. For example, the user may already know what it is that they wish to purchase and can provide text to a text entry field to indicate products that they would like to purchase. The search component 106 can receive these products and can locate retail stores in the geographical area of interest to the user that have such products in stock. The map generator component 108 can generate the map such that the retail stores are represented in the map by graphical icons to show to the user which retails stores in the geographical area of interest to the user have one or more products in the list of products provided by the user. Furthermore, the map can include data that indicates prices of the products at the retail stores. The user may then select one or more selectable links corresponding to a retail store, which can cause other products in stock at the retail store to be presented to the user that are similar to a product in the list or accessories to the products in the shopping list provided by the user. The user can select one of these recommended products, which can be added to the shopping list originally entered by the user. The search component 106 can update the search and subsequently the map generator component 108 can update the map to indicate which stores have the newly selected products. Once the user has completed their shopping list and wishes to purchase one or more of the products, the user can select one or more of the retail stores on the map by selecting a selectable link, for instance, which can cause driving directions from the user's current location to the selected retail store, to be presented to the user.

In another exemplary utilization of the system, the user may be on a shopping trip with their mobile phone and may be in a retail store where they view a product that is of interest to the user. The user can utilize the camera on the mobile phone to capture an image of the bar code, for instance. This image can be transmitted to the search component 106, which can have image recognition functionality thereon to locate a product that corresponds to the captured bar code. Once the product has been located, the search component 106 can search the data store 102 to determine if any other stores in the geographic area of interest to the user (close to the user's current location) have the selected product in stock. If the selected product is in stock, the map generator component 108 can transmit a map to the mobile phone of the user, wherein the map includes graphical icons representative of the stores that have such product in stock and prices corresponding to the product at the retail stores represented on the map. In this example, the user can quickly determine whether the user should purchase the product at the retail store where they are currently viewing the product, or travel to a different retail store to purchase the product at a better price or at a retail store with better return policies, etc.

The data 104 in the data store 102 has been described above as pertaining to brick and mortar retail stores and online retail stores. It is also contemplated that the data 104 can comprise data from used sellers, auction sites, etc. For instance, the data 104 can comprise data from an online classified system and the search component 106 can be configured to search over data in the online classified system. Furthermore, the constraint of used, news, refurbished can be relaxed by the recommender component 116 when providing recommended products to the user. For example, a product included in a shopping list by the user may be a particular model of electronic equipment, and the model number of the electronic equipment as well as the status of new/used can be relaxed by the recommender component 116. This can allow the recommender component 116 to make a recommendation to the user of a used product for sale by way of an online classified system that is a previous model of the product selected by the user but at a much discounted price. This data may be then shown on the map generated by the map generator component 108 or in a side panel on such map to the user such that the user can quickly ascertain whether they would like to purchase the used product at the discount price or the new product at a retail store that is convenient to the user.

Figure 2:
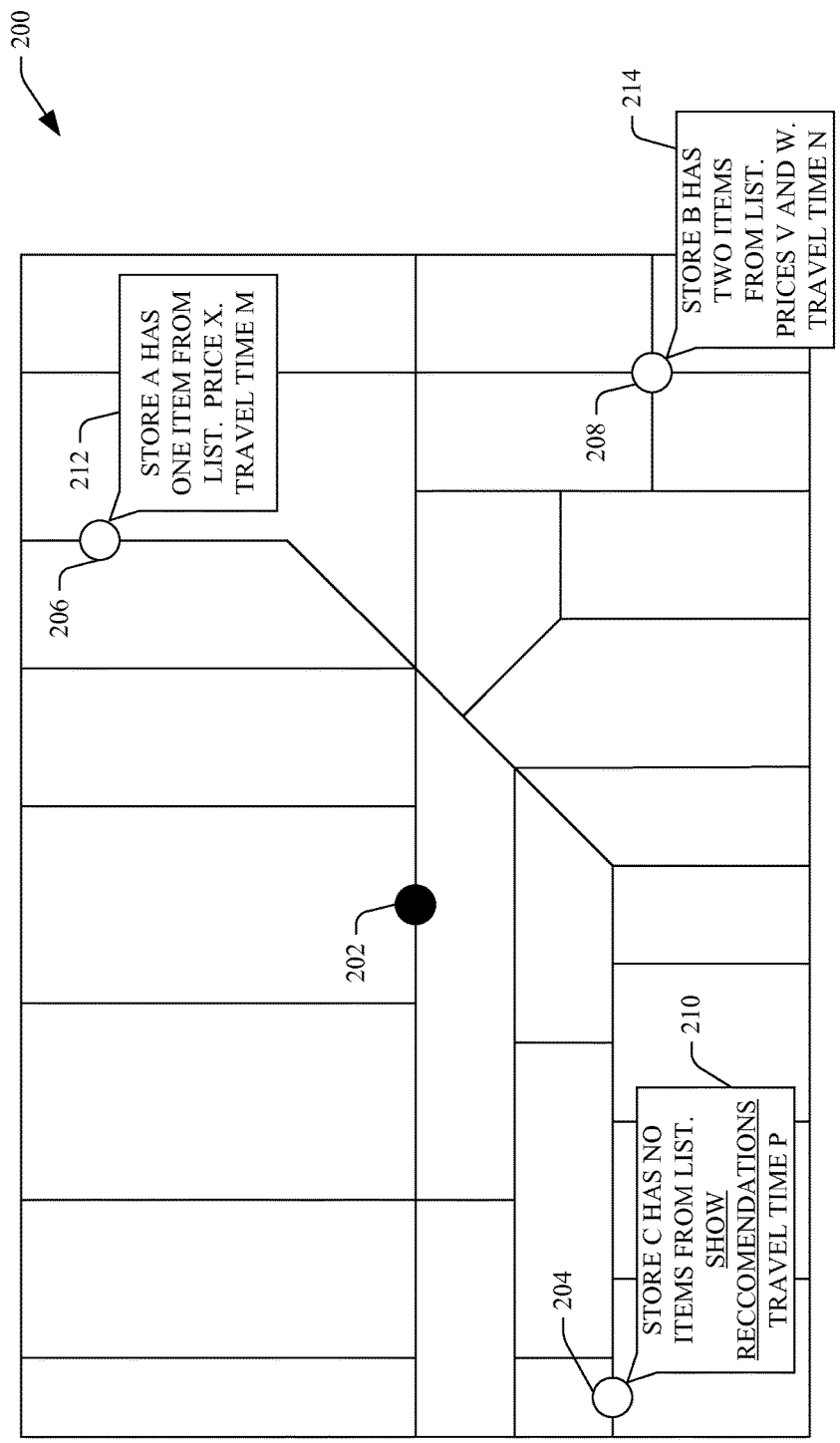
FIG. 2 is an exemplary map that can be generated through utilization of the system of FIG. 1.

With reference now to FIG. 2, an exemplary map 200 that can be generated by the map generator component 108 is illustrated. The map 200 comprises a graphical icon 202 that is representative of a geographic reference point, which may be a current location of a user or a future location of the user. Thus, directions output by the map generator component 108 can originate from the location on the map 200 corresponding to the graphical icon 202. The map 200 further comprises a plurality of other graphical icons 204, 206 and 208, wherein each of the graphical icons is representative of a retail store that is in the geographical area of interest to the user and has a product in stock that is included in a shopping list provided by the user and/or has a product in stock that is recommended to the user. For instance, as described above, the user may provide a shopping list that comprises multiple products. The search component 106 can locate a plurality of retail stores that have one or more of the products in stock in the geographical area of interest of the user. Furthermore, the recommender component 116 can relax constraints corresponding to one or more of the products in the shopping list and the search component 106 can search inventory of retail stores in the geographical area of the user based upon this relaxed constraint.

In the exemplary map shown in FIG. 2, the first graphical icon 204 has a text box 210 corresponding thereto that indicates that a particular retail store in the geographical area of interest of the user includes no items in the shopping list provided by the user. It is shown, however, that the retail store corresponding to the graphical icon 204 comprises recommended products that are substitutes for one or more products provided in the shopping list or accessories to one or more products provided in the shopping list. A selectable icon can be presented to the user such that upon selection of such icon, identities of the recommended products and/or prices pertaining thereto can be provided to the user. This selectable hyperlink is shown in the text boxes being underlined text. The text box 210 can further comprise data indicative of travel time from the current location of the user to the retail store represented by the graphical icon 204.

The graphical icon 206 can have a text box 212 corresponding thereto that indicates that at least one product in the shopping list provided by the user is in stock at the retail store represented by the graphical icon 206. Furthermore, data in the text box 212 can indicate a price of the at least one product at the retail store and a travel time to the retail store from the current location of the user. While not shown, the text boxes 210 and 212 can also include selectable hyperlinks that cause driving directions to be delivered to the user upon selection thereof.

The third graphical icon 208 is representative of a third retail store has a third text box 214 associated therewith, wherein contents of the text box 214 comprise data that indicates that the store represented by the graphical icon 208 has two items from the shopping list in stock, prices corresponding to such items, and travel time to the retail store from the reference location. It is to be understood that the map 200 is exemplary in nature and can display additional data other than what has been shown. Additional data can include data pertaining to online retailers, current or future sales that are to occur at the retail stores, whether the user has accounts at the retail stores, special offers provided at the retail stores, return policies of the retail stores, a side panel that includes data pertaining to products from an online retailer, data pertaining to used products available by way of an auction site or online classified system, etc. Therefore, from viewing the map 200 the user can make a time/price/value determination, wherein time corresponds to the amount of time required to purchase products in the shopping list at the retail stores or online, price corresponds to the price of the items across the retail stores or online retailers, and value corresponds to return policies and other data that is indicative of the overall value of purchasing products at particular retail stores, online retailers or user refurbished items through other online sites.

Figure 3:
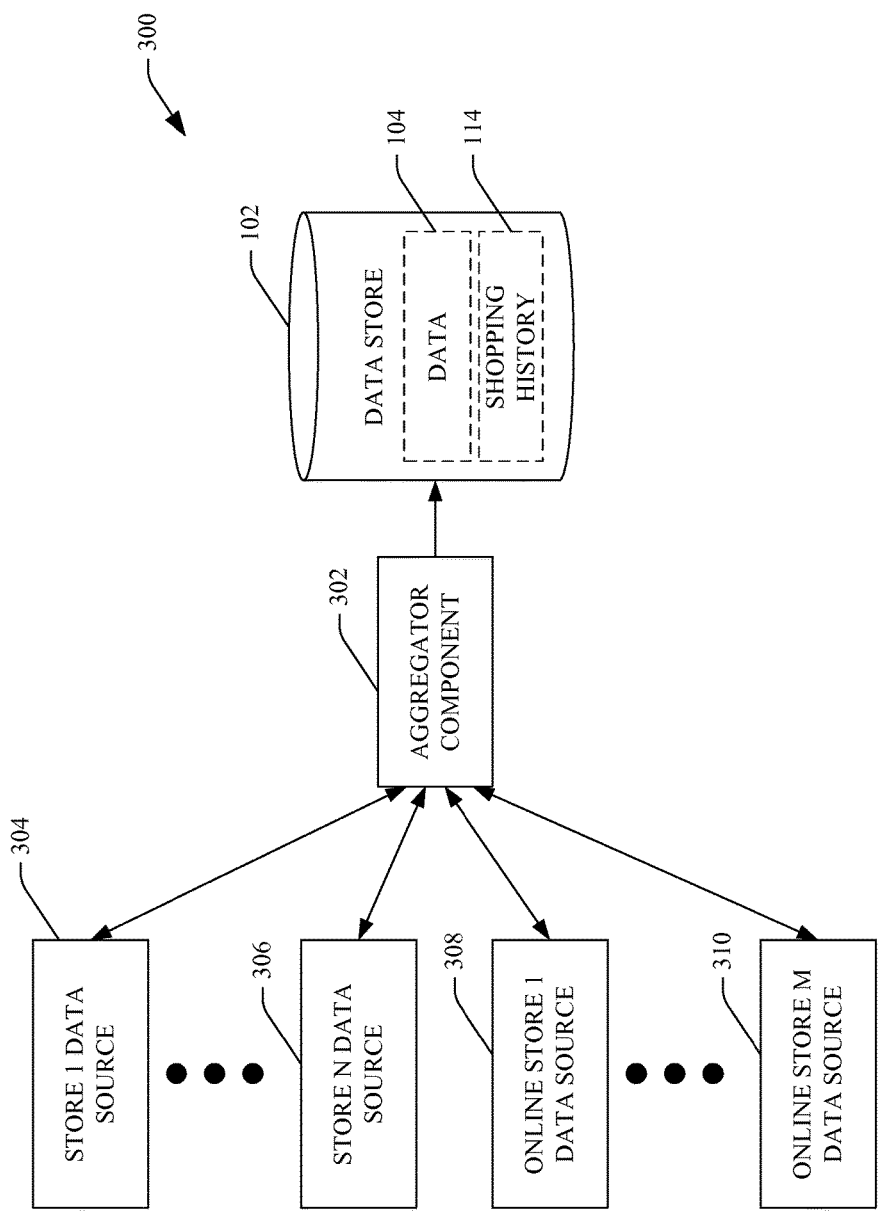
FIG. 3 is a functional block diagram of an exemplary system that facilitates aggregating inventory data from multiple retail stores.

Now referring to FIG. 3, an exemplary system 300 that facilitates obtaining inventory data from a plurality of retail stores, online retailers, etc. is illustrated. The system 300 comprises an aggregator component 302 that is in communication with multiple data sources. These data sources can include a first data source 304 pertaining to a first retail store through an Nth data source 306 pertaining to an Nth retail store, a data source 308 pertaining to a first online retail store, and a data source 310 pertaining to an Mth online retail store. The retails stores corresponding to the data sources 304-306 can be brick and mortar stores, while the data sources pertaining to the online stores 308-310 can pertain to online retail stores, online classified systems, etc.

The aggregator component 302 can receive inventory data, price data and product information from each of the data sources 304-310 in real time or near real-time. In a first exemplary embodiment, the aggregator component 302 can be configured to ping the data sources 304-310 periodically or from time to time to obtain inventory data with respect to each of the stores/online providers. In another example, the data sources 304-310 or one or more of such data sources 304 through 310 can be configured to push inventory data from time to time to the aggregator component 302, which can then populate the data store 102 with the data 104. Moreover, the aggregator component 302 can be configured to receive shopping history data 114 from the data sources 304-310 such that shopping patterns of shoppers at the stores/online retailers can be ascertained when recommending products. In yet another exemplary embodiment, rather than the system 300 comprising the aggregator component 302, the data sources 304-310 may be open such that for each search generated by the user, the search component 106 can directly search the inventory of the retail stores without aggregating such data at a central source. Other embodiments for aggregating inventory data from retail stores, online retailers, classified systems, etc. are contemplated and are intended to fall under the scope of the hereto appended claims.

Figure 4:
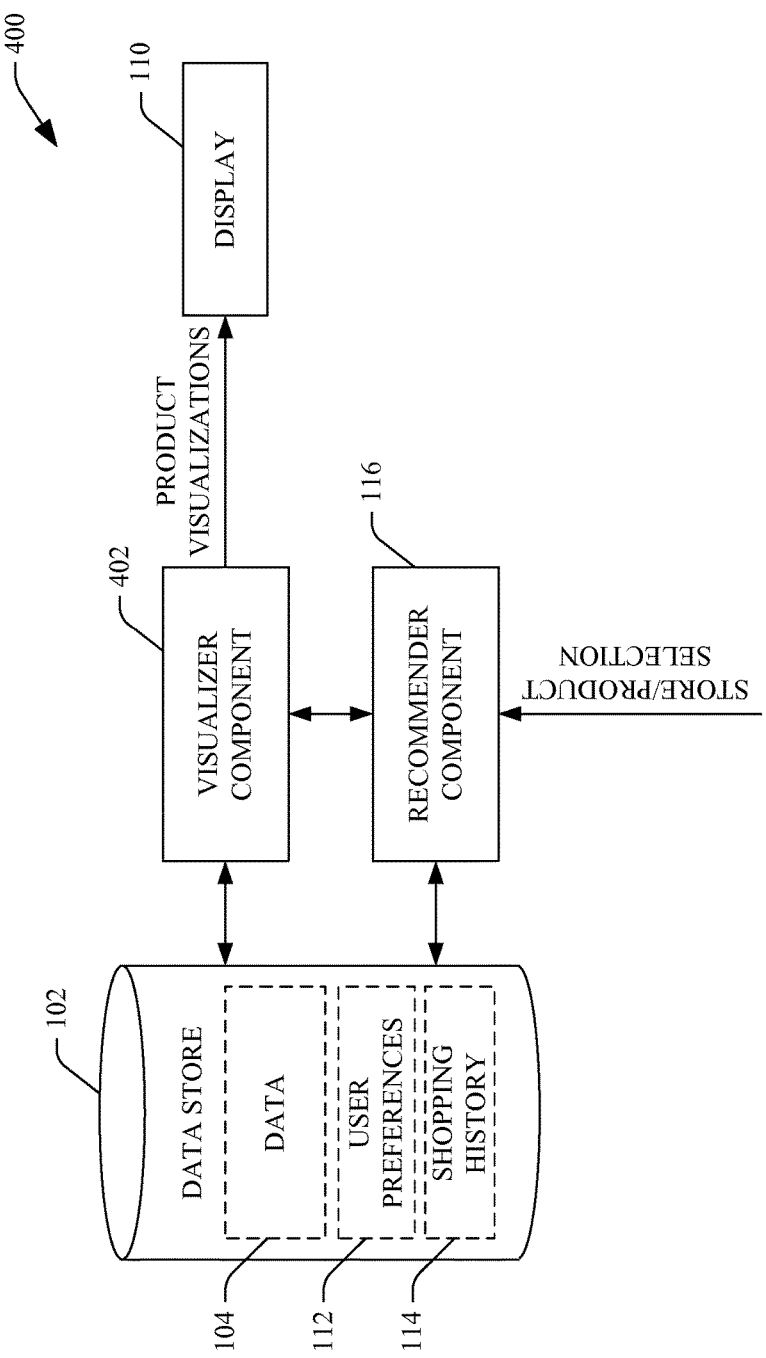
FIG. 4 is a functional block diagram of an exemplary system that facilitates visualizing products in one or more retail stores.

With reference now to FIG. 4, an exemplary system 400 that facilitates visualizing products at a retail store to a user is illustrated. The system 400 comprises a data store 102 which retains the data 104, the user preferences 112 and the shopping history 114, which have been described above. In this exemplary system 400, the user has selected one or more graphical icons representative of a particular retail store on a map generated by the map generator component 108. Selection of such graphical icon can cause the product that is available in the retail store to be presented to the user in the form of an image, textual description, price information, etc. Based at least in part upon the product displayed to the user, the recommender component 116 can access the data store 102 to review user preferences 112, shopping history 114 and the inventory data pertaining to the selected retail store to recommend a product that is an accessory to, or similar to, the product selected by the user through utilization of the map. This recommended product is also in stock at such retail store.

A visualizer component 402 is in communication with the recommender component 116 and can provide a visualization of the product and recommended products for display on the display 110 to the user. The process can be interactive such that when the user selects another product presented to the user by the visualizer component 402, such product can be added to the shopping list. The recommender component 116 can generate new recommendations for products that are at such stores and a visualization of products in the store can change. In a particular example, the user may select a video game console at a retail store and the recommender component 116 can access the inventory of the retail store and recommend other products based upon the selection of the video game console. These other products may include other types of video game consoles or video games, controllers, etc. that are accessories to the selected video game console. Accordingly, the visualizer component 402 can generate a visualization that includes, for instance, at the center of the visualization a depiction of the selected video game console and at the periphery of such video game console, other video game consoles and/or accessories pertaining to the video game console or the other video game consoles can be displayed.

Upon selection of one or more of the recommended products, the visualizer component 402 can change the visualization such that the selected product is located at the center and other recommended products are located at the periphery of a view generated by the visualizer component 402, wherein each of these accessories are in stock at the retail store that has been selected by the user. The user may then select one or more of these products, which are added to the shopping list, and the search component 106 can perform a search for products in the updated shopping list (and recommended products). Additionally the user can, through the visualizer component 402, place a product on hold for a predetermined amount of time such that the user has the ability to place the product on hold from home and then travel to the retail store to pick up the selected product or products. Alternatively, once the user has made selections at the retail store of recommended products, the user can back out of that view and provide the updated list to the search component 106, which can search the inventories of multiple retail stores in the data 104 and can output locations of the items across multiple retail stores in the geographic area of interest to the user.

With reference now to FIGS. 5-8, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Figure 5:
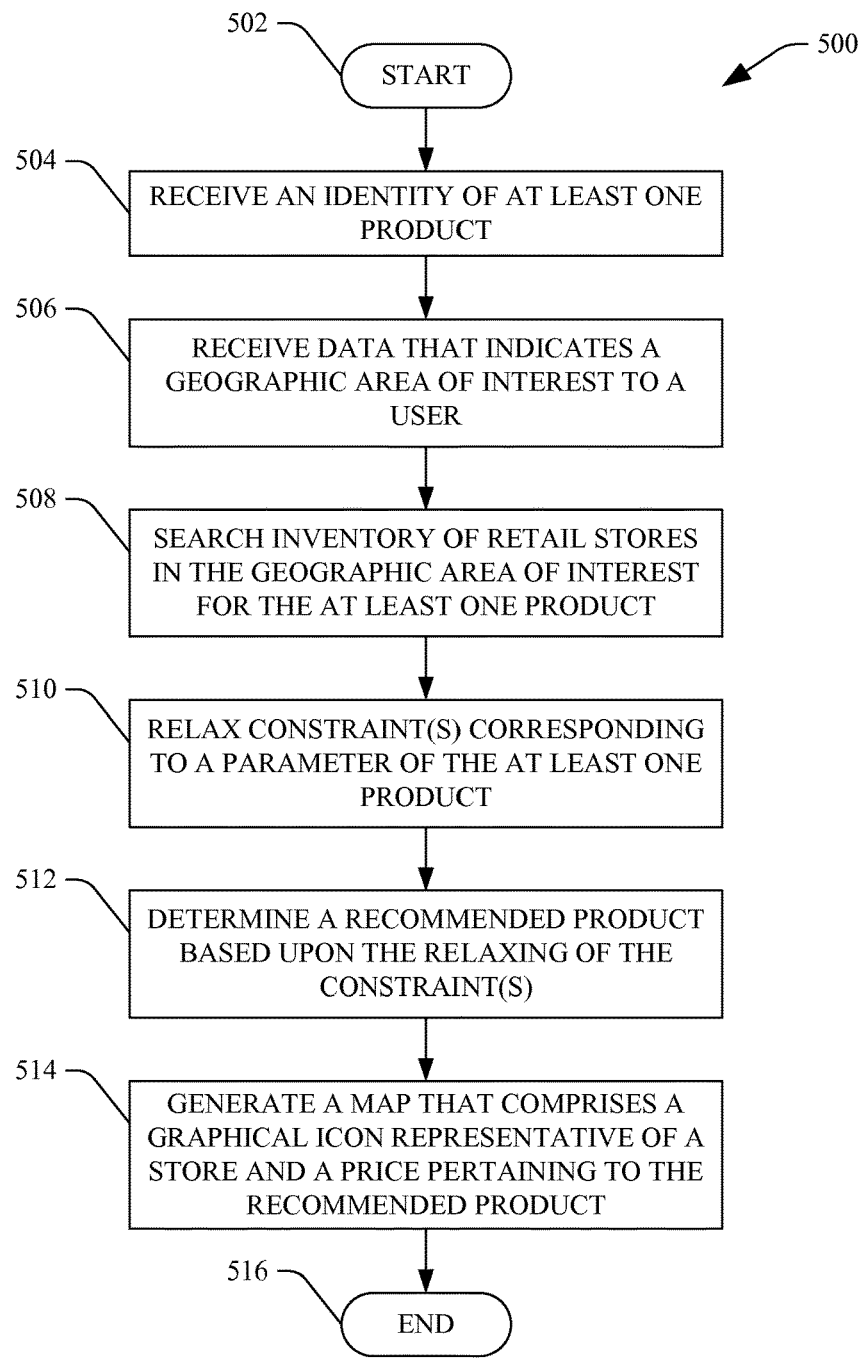
FIG. 5 is a flow diagram that illustrates an exemplary methodology for generating a map that comprises representations of a store and a price pertaining to a recommended product.

Referring now to FIG. 5, a methodology 500 that facilitates generating a map that comprises representations of retail stores in a geographical area of interest to a user that has one or more products of interest in stock is illustrated. The methodology 500 begins at 502, and at 504 an identity of at least one product that is of interest to the user is received. As described above, this identity of the product can be received explicitly in text from the user, may be received through the user selecting a hyperlink, may be received through the user selecting a particular parameter corresponding to the product (e.g., flat panel televisions with screen size 50" or higher), etc.

At 506, data that indicates a geographic area of interest to the user is received. This data can be received from a GPS corresponding to a mobile computing device of the user, thereby indicating a current location of the user. In another example, the geographic area of interest to the user can be ascertained based upon previous user shopping patterns.

At 508, inventory of retail stores in a geographic area of interest are searched for the at least one product identified at 504. Furthermore, while not shown, a search can be undertaken over an inventory of online stores, over classified ads, over used resellers, etc.

At 510, one or more constraints corresponding to the parameters of the at least one product is relaxed. For instance, the user may have selected a particular brand of product. This brand can be relaxed to include other brands. In another example, if the user selected a particular price for a product, the price constraint can be somewhat relaxed to include products in other price ranges.

At 512, a recommended product is determined based at least in part upon the relaxing of the constraints undertaken at 510. This recommended product can be an accessory to the identified product or a substitute to the identified product.

At 514, a map is generated that comprises a graphical icon that is representative of a retail store that has the identified product or recommended product in stock and a price pertaining to the identified product or recommended product. Therefore, the user can be visually provided with data that indicates an amount of time it will take the user to travel to the retail store where the recommended product is in stock, and a price corresponding to the recommended item at the retail store. The methodology 500 completes at 516.

Figure 6:
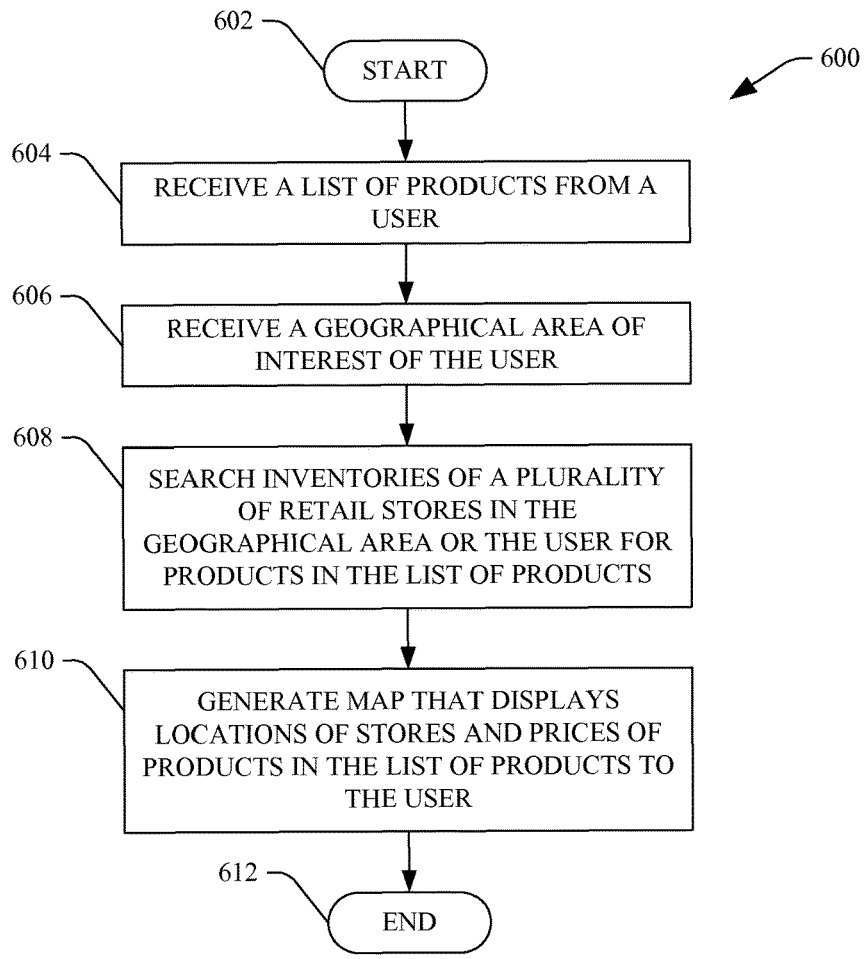
FIG. 6 is a flow diagram that illustrates an exemplary methodology for generating a map that displays locations of retail stores and prices and products in a list of products provided by a user.

Now turning to FIG. 6, an exemplary methodology 600 that facilitates generating a map that displays locations of retail stores with prices of products in a user-generated shopping list of products is illustrated. The methodology 600 starts at 602, and at 604 a shopping list of products is received from the user. This list of products can be received by the user selecting several hyperlinks corresponding to products, from receiving a text shopping list from a user, etc.

At 606, a geographical area of interest to the user is received, and at 608 inventories of a plurality of retail stores in a geographical area of interest to the user are search for products in the shopping list of products received at 604. At 610, a map is generated at displayed locations of retail stores and prices of products in a list of products to the user, and the methodology completes at 612.

Figure 7:
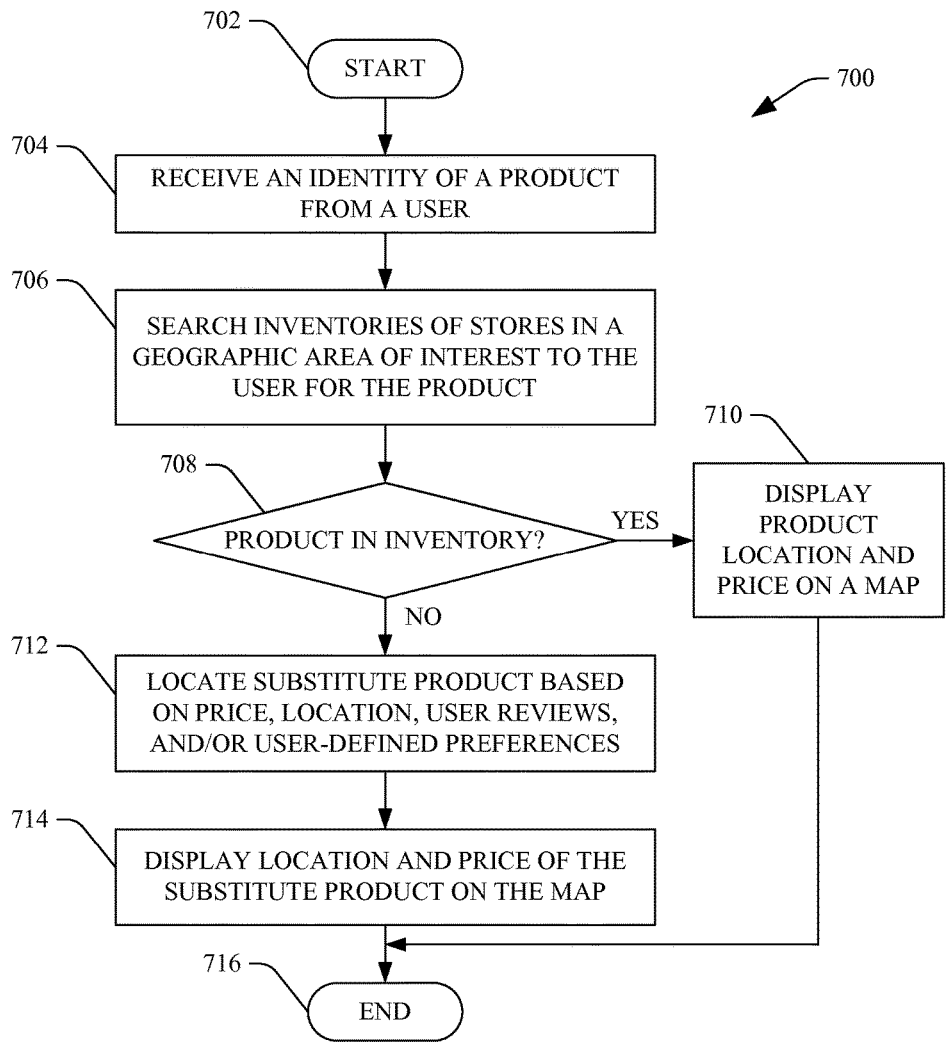
FIG. 7 is a flow diagram that illustrates an exemplary methodology for displaying location and price of a substitute product on a map.

Now referring to FIG. 7, an exemplary methodology 700 that facilitates selection and display of a substitute item to a user is illustrated. The methodology 700 starts at 702, and at 704 an identity of a product is received from a user. At 706, inventories of retail stores in a geographic area of interest to the user are searched over for the product. At 708, a determination is made regarding whether the product is in inventory at one or more of the retail stores in the geographic area of interest to the user. If the product is in stock at the one or more retail stores, then at 710 the product location and price is displayed on a map. That is, a geographic icon representative of the retail store that has the product in stock is shown on the map together with a price of the product at such retail store.

If at 708 it is determined that the product is not in stock at the one or more retail stores in the geographic area of interest to the user, then at 712 a substitute product is located in the inventory of the one or more retail stores in the geographic area of interest to the user. The substitute product can be selected based upon one or more factors, including similarity to the identified product, price of the identified product, etc. Specifically, a "best guess" can be taken as to which product is closest to the product identified by the user in terms of price, quality, etc. For instance, the substitute product can be selected based upon price, location of the retail store that has the substitute product in stock, and/or user reviews. Furthermore, explicitly provided or inferred preferences of the user can be taken into consideration when selecting a substitute product. At 714, location and price of the substitute product is displayed on the map, and the methodology 700 completes at 716.

Figure 8:
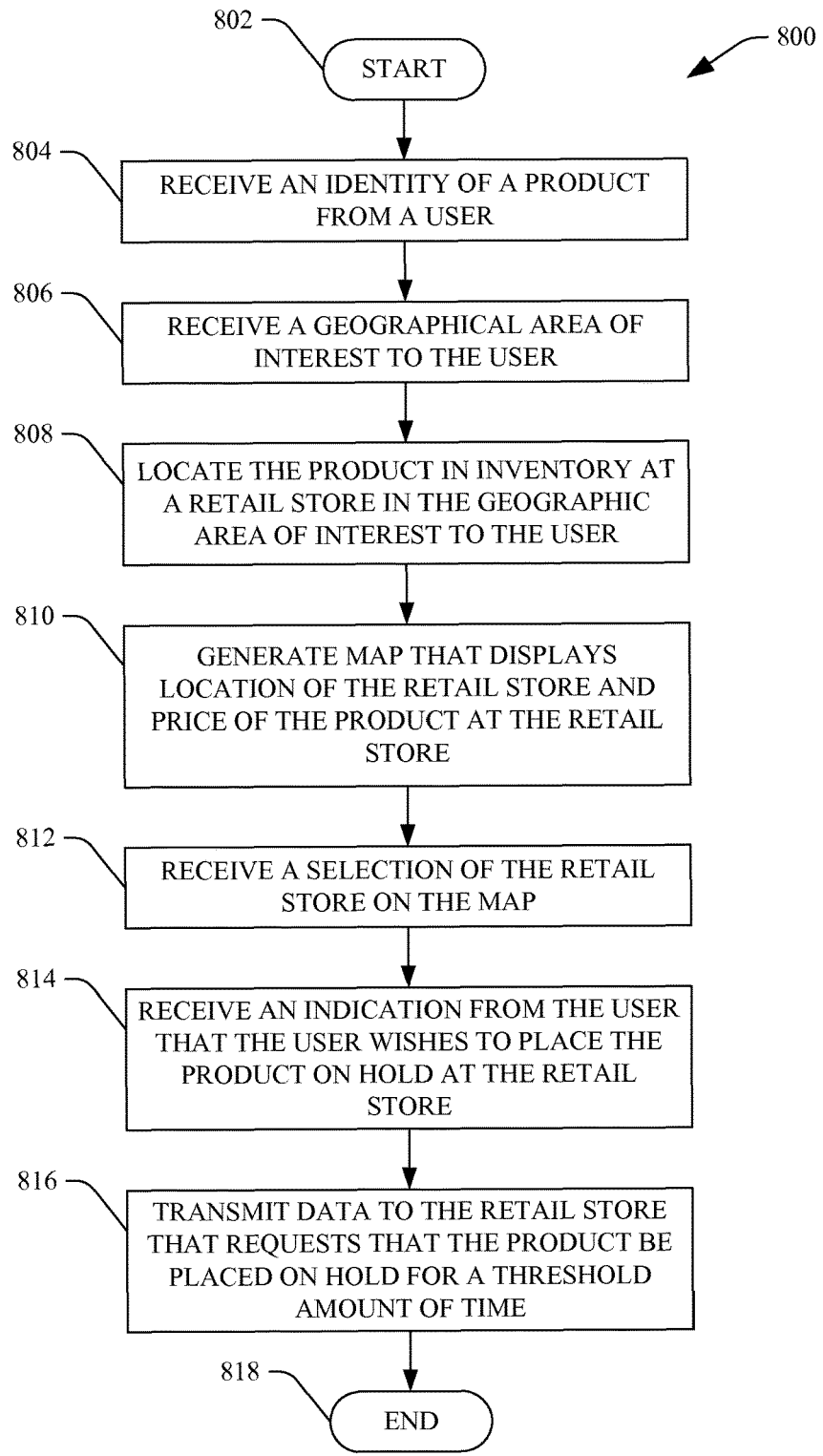
FIG. 8 is a flow diagram that illustrates an exemplary methodology for causing a product to be placed on hold at a retail establishment.

With reference now to FIG. 8, an exemplary methodology 800 that facilitates allowing a customer to place a particular product on hold at a retail store is illustrated. The methodology 800 starts at 802, and at 804 an identity of a product is received from a user. At 806, a geographical area of interest to the user is received, and at 808 a product in inventory of the retail store in the geographic area of interest to the user is located. At 810, a map that displays the location of the retail store and the price of the product at the retail store is generated.

At 812, a selection of the retail store on the map is received from the user. For instance, the user can place a mouse pointer over an icon representative of the retail store and select the retail store, which can cause a graphical icon pertaining to the product to be displayed.

At 814, an indication is received from the user that the user wishes to place the product on hold at the retail store. For instance, a button in a graphical user interface can be provided that indicates to the user that the user can place the product on hold, and the user can depress such button. At 816, responsive to receipt of the indication, data is transmitted to the retail store that requests that the product be placed on hold for a threshold amount of time. The retail store can place the product on hold such that another individual does not come into the retail store and purchase the product. The methodology 800 completes at 818.

Figure 9:
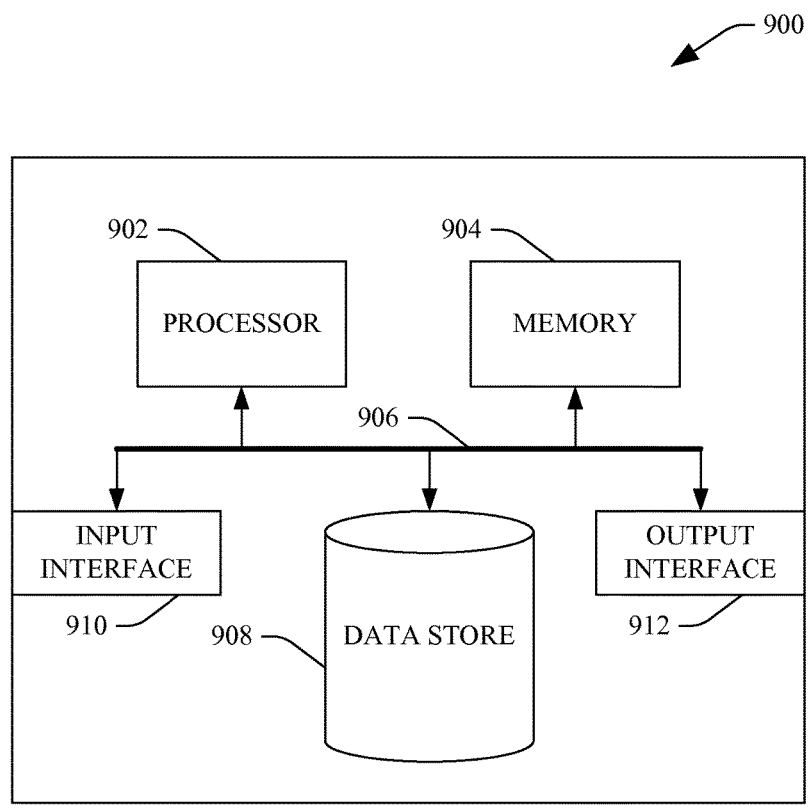
FIG. 9 is an exemplary computing system.

Now referring to FIG. 9, a high-level illustration of an exemplary computing device 900 that can be used in accordance with the systems and methodologies disclosed herein is illustrated. For instance, the computing device 900 may be used in a system that supports recommending products. In another example, at least a portion of the computing device 900 may be used in a system that supports searching inventories of retail stores in a particular geographic region and generating a map of such retail stores in the particular region. The computing device 900 includes at least one processor 902 that executes instructions that are stored in a memory 904. The memory 904 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store product inventory, user shopping preferences, historical shopping patterns, etc.

The computing device 900 additionally includes a data store 908 that is accessible by the processor 902 by way of the system bus 906. The data store 908 may be or include any suitable computer-readable storage, including a hard disk, memory, etc. The data store 908 may include executable instructions, inventory of retail stores, user shopping preferences, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by at least one processor of at least one server computing device, the method comprising:

generating a computer-implemented map of a geographic area that is of interest to a user, the map generated responsive to receiving, from a client computing device and over a network connection, an identity of at least one product, wherein the user has expressed interest in purchasing the at least one product, the at least one product has a parameter corresponding thereto, and the parameter has a constraint corresponding thereto, the constraint being on one of price of the at least one product, brand name of the at least one product, or model of the at least one product, wherein generating the computer-implemented map comprises:
  receiving, from the client computing device and over the network connection, location data that is indicative of the geographic area;
  relaxing the constraint corresponding to the parameter of the product;
  in response to receipt of the location data that is indicative of the geographic area and the relaxing of the constraint, executing a search over data in a data repository based upon the geographic area of interest and the relaxing of the constraint, wherein executing the search comprises:
    locating at least one retail store in the geographic area of interest;
    searching an inventory of the at least one retail store to locate a recommended product, wherein the searching of the inventory is based upon the relaxing of the constraint corresponding to the parameter of the product; and
    determining a price of the recommended product at the at least one retail store, wherein the computer-implemented map of the geographic area, when generated, comprises data that identifies a location of the at least one retail store, data indicative of an identity of the at least one retail store, and the price of the recommended product;
  transmitting, to the client computing device and over the network connection, the computer-implemented map for presentment on a display of the client computing device;
  receiving an indication that the user has selected a graphical icon on the map that is representative of the at least one retail store; and
  responsive to receiving the indication, transmitting graphical data corresponding to at least one other product that is in stock at the at least one retail store that is related to the at least one product.

2. The method of claim 1, wherein searching the inventory of the at least one retail store comprises locating the recommended product in the inventory based at least in part upon purchase patterns of the user.

3. The method of claim 1, wherein searching the inventory of the at least one retail store comprises locating the recommended product in the inventory based at least in part upon purchase patterns of other users.

4. The method of claim 1, wherein searching the inventory of the at least one retail store comprises locating the recommended product in the inventory based at least in part upon products in stock at the at least one retail store that are similar to the at least one product.

5. The method of claim 1, wherein the at least one constraint is on the price of the at least one product.

6. The method of claim 1, wherein the data that is indicative of the identity of the at least one retail store is a graphical icon that is representative of the at least one retail store, the graphical icon positioned on the map to identify the location of the at least one retail store in the geographic area, wherein generating the map further comprises providing a selectable link in relation to the graphical icon, the method further comprising transmitting driving directions to the client computing device for presentment on the display thereof, the driving directions being to the at least one retail store.

7. The method of claim 1, wherein executing the search comprises:
  locating a plurality of retail stores in the geographic area of interest based upon a shopping list of products that are of interest to the user, wherein the shopping list comprises a plurality of products; and
  searching inventories of the plurality of retail stores to identify which of the plurality of retail stores has at least one product in the plurality of products in inventory and to further identify prices of the plurality of products at the plurality of retail stores; wherein the map, when generated, comprises graphical icons that are respectively representative of the plurality of retail stores, wherein at least one of the following are displayed in association with the graphical icons:
    prices pertaining to the products in the multiple retail stores; or
    prices pertaining to recommended products in the multiple retail stores.

8. The method of claim 7, wherein generating the map comprises causing a plurality of selectable links to be displayed, wherein selection of a first selectable link causes a driving route to be output that directs the user to a subset of the multiple retail stores to purchase the plurality of products at a collectively cheapest price.

9. The method of claim 8, wherein selection of a second selectable link causes a driving route to be output that directs the user to a subset of the multiple retail stores to purchase the plurality of products in a least amount of driving time.

10. The method of claim 1, wherein executing the search over the data in the data repository further comprises:
  searching an inventory of an online retail store to locate the product and price of the product at the online retail store, the method further comprising causing the price of the product at the online retail store to be displayed in a side panel adjacent to the map.

11. The method of claim 1, wherein the location data is received from a Global Positioning System (GPS) receiver of the client computing device, the method further comprising:
  inferring the geographic area based upon the position data.

12. The method of claim 1, further comprising:
  responsive to receiving the indication, transmitting second graphical data that indicates that the user is able to place the at least one product on hold at the at least one retail store;
  receiving an indication that the user wishes to place the at least one product on hold; and
  transmitting a message to a computing device of the at least one retail store that instructs the at least one retail store to place the at least one product on hold for a predefined amount of time responsive to receiving the indication that the user wishes to place the at least one product on hold.

13. A system comprising:
  a processor; and
  memory storing instructions that, when executed by the processor, cause the processor to perform acts comprising:
    executing a search over data in a data repository based upon an identity of a product set forth in a query transmitted to the system over a network connection between a client computing device and the system, wherein the product has a parameter associated therewith, the data in the data repository comprises inventories of a plurality of retail stores in a geographic area of interest to a user, wherein a constraint pertaining to the parameter of the product is relaxed when executing the search to locate a recommended product that is in stock at a retail store amongst the plurality of retail stores, the constraint being on at least one of price of the product, brand of the product, or model of the product;

generating a map of the geographic area of interest for display on a display of the client computing device in response to receipt of the query, the map comprises a graphical icon that is representative of the retail store that has the recommended product in stock and price data corresponding to the recommended product at the retail store;

transmitting the map of the geographic area to the client computing device over the network connection;

receiving an indication that the user has selected the graphical icon on the map of the geographic region;

responsive to receiving the indication, transmitting graphical data that indicates that the user is able to place the recommended product on hold at the retail store;

receiving an indication that the user wishes to place the recommended product on hold; and transmitting a message to a computing device of the retail store that instructs the retail store to place the recommended product on hold for a predefined amount of time responsive to receiving the indication that the user wishes to place the recommended product on hold.

14. The system of claim 13, wherein executing the search comprises determining the recommended product based at least in part upon the relaxed constraint.

15. The system of claim 14, wherein the recommended product is determined based at least in part upon historical shopping data of the user.

16. The system of claim 14, wherein the recommended product is determined based at least in part upon historical shopping patterns of other users.

17. The system of claim 13, wherein the data in the data repository comprises inventories of the plurality of retail stores, wherein the search is executed over the data in the data repository for a plurality of products included in the query, and further wherein the map is generated such that the map comprises graphical icons representative of multiple retail stores in the geographic area that have at least one of the products in stock, and wherein the map further comprises data that is indicative of prices of the products at the multiple retail stores.

18. The system of claim 13, wherein the map further comprises a selectable link that is displayed in association with the graphical icon, the acts further comprising outputting driving directions to the retail store to the client computing device responsive to receipt of an indication that the user has selected the selectable link at the client computing device.

19. A computer-readable storage device comprising instructions that, when executed by a processor, cause the processor to perform acts comprising:

generating a computer-implemented map of a geographic area of interest to a user responsive to receiving a query from a client computing device of the user that is in network communication with the processor, the map comprises a graphical icon that is representative of a retail store at a location on the map that is representative of a geographic location of the retail store in the geographic area, the query comprises an identity of a product, wherein the product has a parameter corresponding thereto, and the parameter has at least one constraint corresponding thereto, the parameter being one of price, brand, or model, and the constraint being on the price, brand, or model of the product, the query further comprises location data that is based upon Global Positioning System (GPS) data generated by the client computing device, wherein generating the computer-implemented map comprises:

defining the geographical area of interest to the user based upon the location data;

responsive to receiving the query and defining the geographical area of interest to the user, executing a search for the product over data in a data repository, the data comprises inventories of multiple retail stores in the geographical area of interest to the user;

relaxing the at least one constraint that corresponds to the parameter;

executing a second search over the data in the data repository based at least in part upon the relaxing of the at least one constraint that corresponds to the parameter, wherein a recommended product in an inventory of at least one of the retail stores in the geographical area of interest to the user is located in the second search, wherein the map, when generated, further comprises first data that indicates that the product is in stock at the retail store;

second data that indicates price of the product at the retail store;

a second graphical icon that is representative of a second retail store;

third data that indicates that the recommended product is in stock at the second retail store; and fourth data that indicates price of the recommended product at the second retail store; and transmitting the map to the client computing device for presentment on a display of the client computing device.

20. The computer-readable storage device of claim 19, wherein the map further comprises:

an icon that is representative of the retail store; and a selectable link that is displayed in association with the icon, wherein the acts further comprise:

outputting driving directions to the retail store to the client computing device responsive to receipt of an indication that the user has selected the selectable link at the client computing device.

* * * * *